United States Patent [19]

Hardy et al.

[11] Patent Number: 4,781,342
[45] Date of Patent: Nov. 1, 1988

[54] METHOD OF PROVIDING RAPID CONVERSION OF AN AIRCRAFT WEAPON CARRIAGE

[76] Inventors: Richard Hardy, 16816 2nd Ave. SW., Seattle, Wash. 98166; Frank D. Neumann, 3003 109th Ave. SE., Bellevue, Wash. 98004

[21] Appl. No.: 84,987

[22] Filed: Aug. 12, 1987

Related U.S. Application Data

[63] Continuation of Ser. No. 781,657, Sep. 30, 1985.

[51] Int. Cl.4 ............................................. B64D 1/04
[52] U.S. Cl. ............................. 244/137.4; 244/118.1; 244/130; 89/1.54; 89/1.802
[58] Field of Search ............... 244/137.1, 137.4, 118.1, 244/130; 89/1.54, 1.59, 1.802, 1.015, 1.816

[56] References Cited

U.S. PATENT DOCUMENTS

| | | | |
|---|---|---|---|
| 2,409,210 | 10/1946 | Jolly | 89/1.54 |
| 2,921,501 | 1/1960 | Parot | 244/137.4 |
| 2,975,676 | 3/1961 | Bulter | 244/137.4 |
| 3,216,322 | 11/1965 | Wenger et al. | 244/137.4 |
| 3,611,865 | 10/1971 | Schallert | 244/137.4 |
| 3,771,416 | 11/1973 | Ackerman et al. | 244/137.4 |
| 4,412,475 | 11/1983 | Hornby | 244/137.4 |

FOREIGN PATENT DOCUMENTS 2017617 10/1974 United Kingdom ............. 244/137.4

Primary Examiner—Galen Barefoot
Attorney, Agent, or Firm—Seed and Berry

[57] ABSTRACT

A method of providing rapid conversion of an internal weapon carriage to an external weapon carriage on an aircraft and returning the external carriage to an internal carriage. The method of conversion providing an aircraft with the option of carrying either weapons with large fixed fins or converting to newer type weapons having either smaller fins or fins that can be folded thereon.

11 Claims, 4 Drawing Sheets

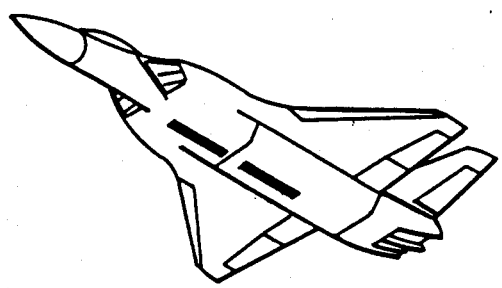
FIG-15
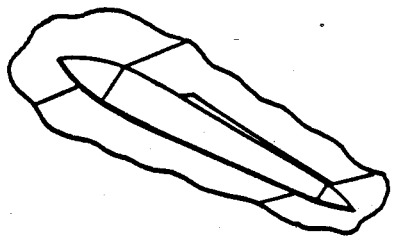
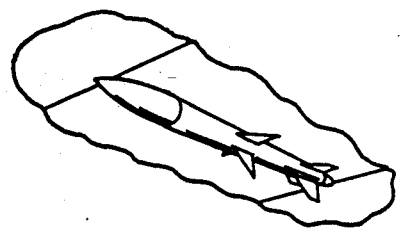
FIG-16  FIG-19
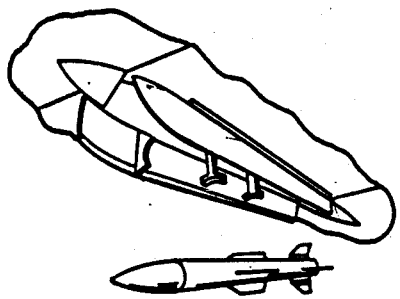
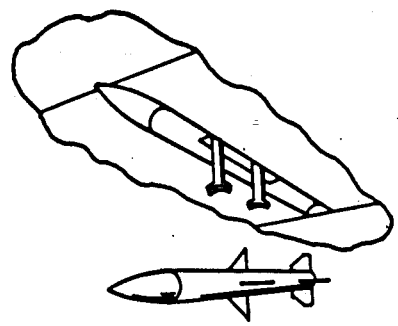
FIG-17  FIG-20
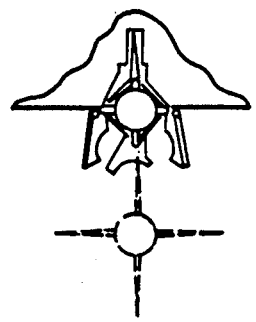
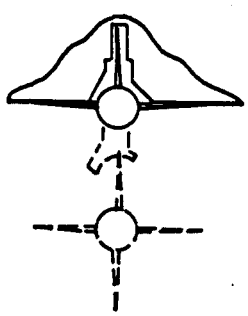
FIG-18  FIG-21

METHOD OF PROVIDING RAPID CONVERSION OF AN AIRCRAFT WEAPON CARRIAGE

This application is a continuation of U.S. patent application Ser. No. 781,657, filed Sept. 30, 1985.

BACKGROUND OF THE INVENTION

This invention relates to a rapid conversion method of installing weapons on an aircraft and more particularly, but not by way of limitation, to a method of providing rapid conversion of an internal weapon carriage to an external weapon carriage for carrying fixed fin weapons such as air-to-air missiles thereon.

Current air-to-air missiles on tactical aircraft embody the use of weapons with large fins. The large fin weapons do not lend themselves for low drag with a low radar signature internal carriage because of aircraft volume constraints. Therefore, missiles, quite often are carried either on pylons, conformal, semi-submerged or on corners of the fuselage depending on the aircraft and the required launch mode.

Future fighter design requirements place an increased emphasis on reduced drag and signature, thereby making an internal weapon carriage mandatory. Therefore, missiles with smaller or folding fins are being developed with are suitable for internal carriage and these types of weapons are expected to be fielded with future tactical fighters. However, substantial numbers of current weapons with large fixed fins are expected to still be in the future inventory. Therefore, the problem the subject invention addresses is to provide a method so an aircraft can carry both types of weapons efficiently. Rapid conversion in the field must be possible with minimum support equipment.

In the following U.S. Patents; U.S. Pat. No. 2,780,422 to Maglio, Jr., U.S. Pat. No. 2,958,260 to Anderson, U.S. Pat. No. 3,242,808 to Nelson et al, U.S. Pat. No. 3,468,501 to Baum, U.S. Pat. No, 3,611,865 to Schallert, U.S. Pat. No. 3,771,516 to Ackerman, Jr. et al, U.S. Pat. No. 4,008,645 to Herbert, U.S. Pat. No. 4,106,389 to Walley, U.S. Pat. No. 4,307,650 to Kuesters et al, U.S. Pat. No. 4,440,365 to Holtrop, U.S. Pat. No. 4,448,373 to Bates et al and U.S. Pat. No. 4,520,975 to Blackhurst various types of aircraft weapon mounting equipment, ejector systems and missiles launching apparatus are described. None of these prior art patents provide the advantages of the subject method for providing an aircraft adaptive weapon carriage conversion method as described herein.

SUMMARY OF THE INVENTION

The subject method for providing rapid conversion of a weapon carriage on an aircraft allows the user of the aircraft to quickly convert from weapons mounted internally to weapons mounted externally. Further, the method allows for returning of external weapon carriage system to an internal carriage mode.

The method lends itself for removing internal or semi-submerged weapon launch tubes and replacing them with launch rails for launching fixed fin weapons. Also, the subject method allows for removing quick-connect fairings with built-in doors and mounting external weapons with fixed fins.

One embodiment of the method provides for lowering a folded fin weapon launch tube from a cruise position to a launch position on the aircraft. The folding fin weapon is removed along with the launch tube. The tube is replaced with the launch rail and a fixed fin weapon is installed thereon. The fixed fin weapon is then raised from a launch position to a cruise position on the aircraft.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 15 through 21 illustrate a fighter aircraft with a semi-submerged internal weapon with folded fins and quick-connect fairings with built-in doors and the removal of the fairings for launching a fixed fin weapon.

DETAILED DESCRIPTION OF THE DRAWINGS

Figure 1:
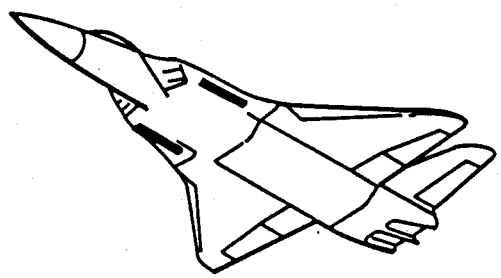
FIGS. 1 through 7 illustrate a method of converting from a semi-submerged weapon tube for holding a folded fin weapon therein to a launch rail for mounting a fixed fin weapon thereon.
Figure 2:
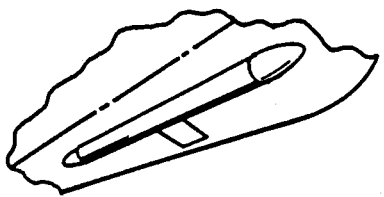
Figure 3:
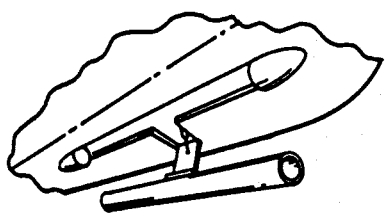
Figure 4:
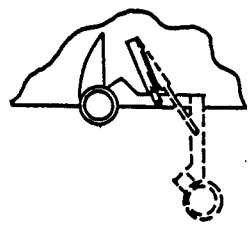
Figure 7:
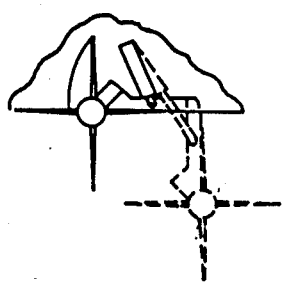

In FIG. 1 an aircraft is designated by general reference numeral 10 having a semi-submerged housing 12 in the bottom of the aircraft 10. An internal launch tube 14 is attached to a hinge deployment arm 16 shown in FIGS. 3 and 4. While the deployment arm 16 is shown the launch tube 15 could be deployed by other linkage arrangements or any other type of deployment mechanism. The arm 16 is secured for raising to the aircraft the tube 14 into a cruise position as shown in FIG. 2. A forward fairing 17 and a rear fairing 18 are positioned on the aircraft at opposite ends of the launch tube 14. In FIG. 3 the launch tube 14 is shown lowered into a launch position. In FIG. 4 a front view of the launch tube 14 is shown both in a cruise position and into a lowered launch position with an internally mounted folded fin weapon 20 received therein.

Figure 5:
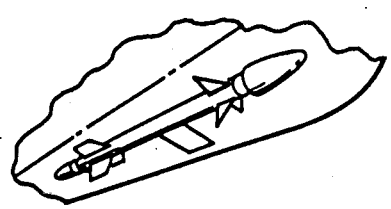
Figure 6:
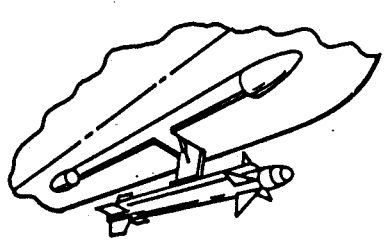

When it is desired to convert the aircraft 10 from launching a folded fin weapon 20 to a fixed fin weapon the launch tube 14 is lowered into a launch position and the tube 14 is removed and replaced with a launch rail 22. The rail 22 is attached to the same hinge deployment arm 16 as shown in FIGS. 6 an d7. A fixed fin weapon 24 is now secured to the launch rail 22 and the weapon 24 is raised into a cruise position as shown in FIG. 5. The weapons 20 and 24 may be air-to-air missiles or any other similar type weapon launched from an aircraft. While the rail 22 is shown it is one of many devices that can be used for deploying an externally mounted weapon.

Figure 8:
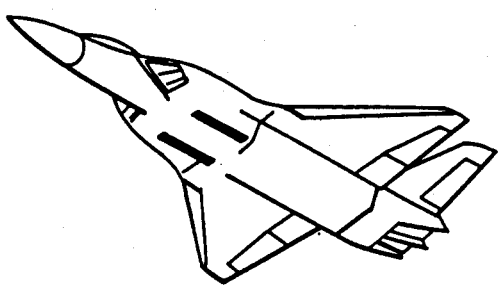
FIGS. 8 through 14 illustrate a method of converting from a semi-submerged launch tube on a corner mount of the aircraft to a rail mount for launching fixed fin weapons.
Figure 9:
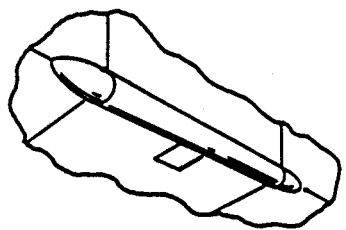
Figure 12:
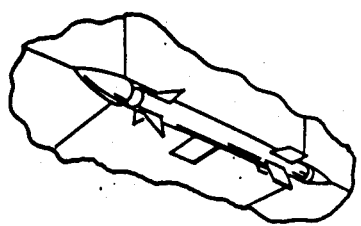
Figure 10:
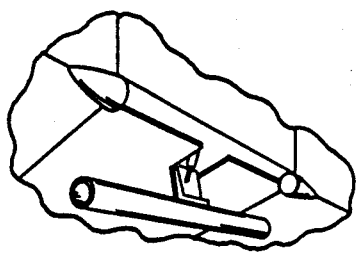
Figure 13:
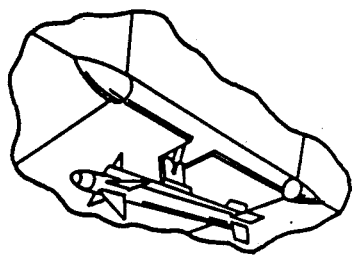
Figure 11:
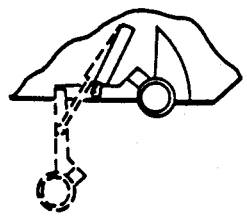
Figure 14:
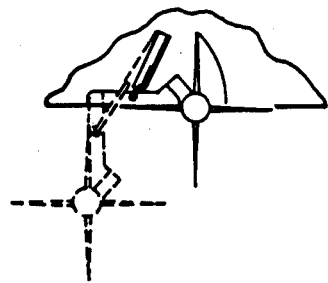

In FIG. 8 a similar aircraft 25 is shown having a corner mount opening 26 for receiving the launch tube 14. The launch tube 14 as shown in FIGS. 10 and 11 is raised and lowered using the hinge deployment arm 16. Inside the tube 14 is a folded fin weapon 20. In FIG. 9 the tube 14 with weapon 20 therein is shown in a cruise position in the corner opening 26. This opening 26 also includes a forward fairing 17 and rear fairing 18. In FIGS. 12, 13 and 14 the corner mount weapon carriage has again been converted to an external launch by removing the tube 14 and installing the launch rail 22. The fixed fin weapon 24 is installed as shown in a launch position in FIGS. 13 and 14 and raised by the deployment arm 16 into a cruise position as shown in FIG. 12.

In FIG. 15 the method of providing a rapid conversion from folded fin to fixed fin weapons is shown used in conjunction with quick-connect housing 29 in the bottom of an aircraft 30. The quick-connect housing 28 consists of front fairing 32 and rear fairing 34 with built-in doors 36. The doors 36 are shown in an open position in FIGS. 17 and 18. Ejectors 38 which are used for holding and releasing the weapon 20 are mounted inside the aircraft 20. In FIG. 16 the weapon 20 is shown received inside the housing 28 with the doors 36 in a closed cruise position. In FIG. 17 the doors 36 are in an open position and the weapon 20 released from the ejectors 38. FIG. 18 shows the front view of the doors 36 in an open position with the ejector 38 having released the weapon 20.

In FIGS. 19, 20 and 21 the quick-connect housing 28 with built-in doors 36 and fairings 32 and 34 have been removed and the fixed fin weapon 24 engaged by the ejector 38. FIG. 19 illustrates the fixed fin weapon 24 in a cruise position and in FIG. 20 the weapon launched from the ejectors 38. As mentioned above in FIGS. 19, 20 and 21 the housing 28 with front and rear fairings 32, 34 and the doors 36 have been removed for receiving the external fixed fin weapon 24. The housing 28 including fairings, doors and door actuators can be packaged as a kit for rapid conversion of the aircraft in the field for carrying either type of the weapon 20 and 24 depending on the requirement.

Figure 22:
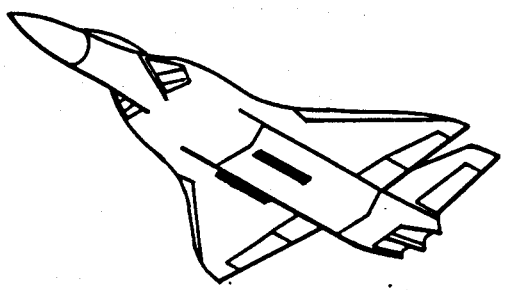
FIGS. 22 through 28 illustrate the aircraft with quick-connect fairings corner mounted on the bottom of the aircraft for conversion to an external fixed fin weapon.
Figure 23:
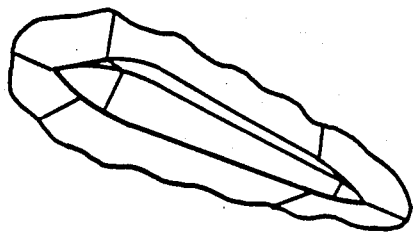
Figure 24:
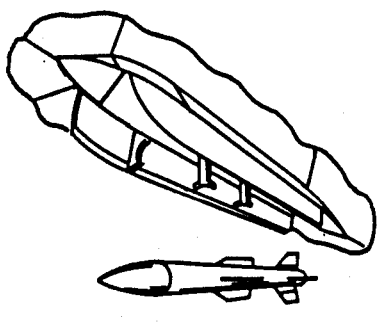
Figure 25:
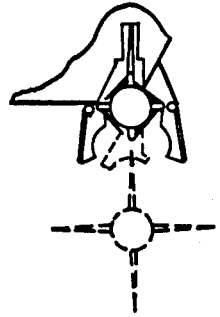

In FIG. 22 an aircraft 40 is shown with corner mount housing 42 consisting of a front fairing 44 and a rear fairing 46 with folding doors 48. Again, a pair of launch ejectors 38 are used for securing the folded fin weapon 20 received inside the housing 42 and folding doors 48 in a closed position. FIG. 24 illustrates the doors 48 in an open position with the folded fin weapon 20 released from the ejectors 38. FIG. 25 illustrates a front view of the weapon 20 in a launch position.

Figure 26:
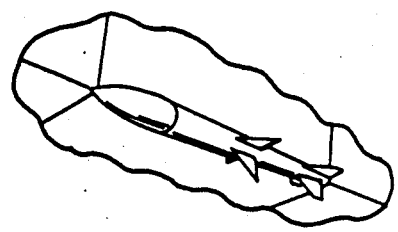
Figure 27:
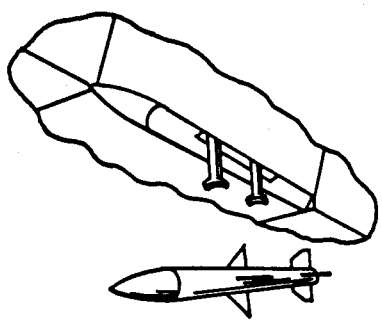
Figure 28:
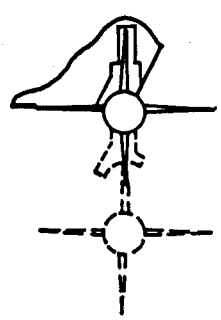

FIG. FIGS. 26, 27 and 28 the corner mount housing 42 consisting of fairings 44 and 46 and folding doors 48 have been removed for receiving the fixed fin weapon 42. FIG. 26 illustrates the fixed fin weapon 24 in a cruise position. FIGS. 27 and 28 illustrate the fixed fin weapon ejected using ejectors 38 and the weapon 24 in a launch position.

From reviewing the above drawings, it can be appreciated that the subject invention provides a method for rapid conversion of an internal weapon carriage to an external weapon carriage on an aircraft with the aircraft having the ability to carry both folded fin weapons and fixed fin weapons depending on the weapons in the current inventory and field requirements.

Changes may be made in the construction and arrangement of the parts or elements of the embodiments as described herein without departing from the spirit or scope of the invention defined in the following claims.

What is claimed is:

1. A method of providing rapid conversion of an internal weapon carriage to an external weapon carriage on an aircraft for folded fin or small fin and large fixed fin weapons, the steps comprising:
   lowering a deployment mechanism attached to a folded or small fin weapon launch tube from a cruise position to a launch position on the aircraft, thereby removing said launch tube from a cavity of said aircraft;
   removing the folded or small fin weapon if one is therein;
   removing the launch tube from the deployment mechanism;
   installing a launch rail on said deployment mechanism, said launch rail having a mounting mechanism;
   installing a large fixed fin weapon on said launch rail, said large fixed fin weapon having a mounting mechanism mating with the mounting mechanism on said launch rail said large fixed fin weapon being approximately the same size as said launch tube; and
   raising the deployment mechanism with said large fixed fin weapon to a cruise position on the aircraft in which said fixed fin weapon is at least partially positioned in said cavity.

2. The method as described in claim 1, further including the following steps:
   lowering the deployment mechanism from a cruise position to a launch position on the aircraft;
   removing the large fixed fin weapon if one is mounted thereon;
   installing a launch tube on the deployment mechanism;
   installing a folded or small fin weapon therein; and
   raising the launch tube with said folded or small fin weapon to a cruise position.

3. The method as described in claim 1 wherein the launch tube and the weapon, when raised to a cruise position are received in a semi-submerged housing in the bottom of the aircraft.

4. The method as described in claim 1 wherein the launch tube and weapon, when raised to a cruise position are received in a corner mount opening in the bottom of the aircraft.

5. An aircraft weapons system for carrying a folding or relatively small fin weapon in a cavity of said aircraft in a semi-submerged configuration, and carrying a fixed, relatively large fin weapon in said cavity in a semi-submerged configuration, said system comprising:
   a deployment mechanism having mounting means, said deployment mechanism being actuatable between cruise and launch positions;
   a relatively large fin weapon having mounting means adapted to be engaged by the mounting means of said deployment mechanism, said deployment mechanism placing said relatively large fin weapon in said cavity in said semi-submerged configuration when said deployment mechanism is in its cruise configuration; and
   a launch tube having mounting means adapted to be engaged by the mounting means of said deployment mechanism, said launch tube being approximately the same size as said large fin weapon, said launch tube being adapted to transport and launch a folding or relatively small fin weapon, whereby said deployment mechanism can transport and launch weapons having folded fins, relatively small fixed fins and relatively large fixed fins in the same cavity of said aircraft.

6. The aircraft weapons system of claim 5 wherein said deployment mechanism is an arm that pivots between said cruise position in which said mounting means is positioned in said cavity in said aircraft and said launch position in which said mounting means is positioned externally from said aircraft.

7. The aircraft weapons system of claim 6, further including removable fairings installed on said aircraft when said launch tube is installed on said deployment mechanism, said fairing smoothly bridging the area between said launch tube and the fuselage of said aircraft.

8. The aircraft weapons system of claim 6 wherein said deployment mechanism is a movable arm actuated between said launch position in which said launch tube or relatively large fixed fin weapon is positioned externally of the aircraft, and a cruise position in which said launch tube or relatively large fixed fin weapon is positioned at least partially within the fuselage of said aircraft.

9. The aircraft weapons system of claim 8 wherein said launch tube or fixed, relatively large fin weapon is semi-submerged in a generally planar portion of said fuselage when said launch tube or fixed, relatively large fin weapon is in its cruise position.

10. The aircraft weapons system of claim 8 wherein said launch tube or fixed, relatively large fin weapon is received in a corner of the fuselage of said aircraft when said launch tube or fixed, relatively large fin weapon is in its cruise position.

11. The aircraft weapons system of claim 8 wherein at least one fin of said fixed, relatively large fin weapon projects from the surface of said aircraft when said weapon is in its cruise position.

* * * * *

UNITED STATES PATENT AND TRADEMARK OFFICE
CERTIFICATE OF CORRECTION

PATENT NO.  : 4,781,342

DATED       : November 1, 1988

INVENTOR(S) : Richard Hardy; Frank D. Neumann

It is certified that error appears in the above-identified patent and that said Letters Patent is hereby corrected as shown below:

On the cover page, add: --Assignee: The Boeing Company--.

In claim 5, column 4, line 62, delete "folded" and substitute therefor --folding--.

Signed and Sealed this

Ninth Day of May, 1989

Attest:

DONALD J. QUIGG

*Attesting Officer*    *Commissioner of Patents and Trademarks*